US008844155B2

(12) United States Patent
Lou

(10) Patent No.: US 8,844,155 B2
(45) Date of Patent: Sep. 30, 2014

(54) HOPPER OF INJECTION MOLDING MACHINE

(75) Inventor: Zhengrong Lou, Yiwu (CN)

(73) Assignee: Zhengrong Lou, Yiwu (CN)

( * ) Notice: Subject to any disclaimer, the term of this patent is extended or adjusted under 35 U.S.C. 154(b) by 429 days.

(21) Appl. No.: 13/250,026

(22) Filed: Sep. 30, 2011

(65) Prior Publication Data

US 2012/0047761 A1 Mar. 1, 2012

Related U.S. Application Data

(63) Continuation of application No. PCT/CN2010/071396, filed on Mar. 29, 2010.

(30) Foreign Application Priority Data

Mar. 30, 2009 (CN) .......................... 2009 1 0301207

(51) Int. Cl.
  *F26B 17/12* (2006.01)
(52) U.S. Cl.
  USPC ................... 34/168; 34/173; 62/601; 44/639; 432/141; 422/110
(58) Field of Classification Search
  USPC ......... 34/60, 80, 90, 168, 174, 201, 210, 218; 62/601, 602, 73, 71; 44/639; 422/165, 422/110; 252/373; 432/45, 139, 141; 99/451, 468, 479
  See application file for complete search history.

(56) References Cited

U.S. PATENT DOCUMENTS

| 2,126,104 | A | * | 8/1938 | Fulton | ............................ 110/186 |
| 2,386,966 | A | * | 10/1945 | MacMillin | .................... 264/453 |
| 2,702,261 | A | * | 2/1955 | Bacon et al. | ................... 428/359 |
| 2,854,339 | A | * | 9/1958 | Fernandez et al. | ............. 426/462 |
| 3,477,703 | A | * | 11/1969 | Michel | ............................. 432/45 |
| 3,625,724 | A | * | 12/1971 | Alvero | .......................... 106/660 |
| 3,718,322 | A | * | 2/1973 | Skelton | ........................... 432/45 |
| 3,985,345 | A | | 10/1976 | Jakob | |

(Continued)

FOREIGN PATENT DOCUMENTS

| CN | 2557310 Y | 6/2003 |
| CN | 101491935 A | 7/2009 |

(Continued)

OTHER PUBLICATIONS

The State Intellectual Property Office of the People's Republic of China, International Search Report in International Application No. PCT/CN2010/071396 (Jul. 8, 2010).

*Primary Examiner* — Steve M Gravini
(74) *Attorney, Agent, or Firm* — Leydig, Voit & Mayer, Ltd.

(57) ABSTRACT

The invention relates to a hopper of an injection molding machine, which comprises a combined hopper, an electric heating air-blasting system and a temperature control system, wherein the combined hopper comprises two or more than two sub-hoppers; each sub-hopper is provided with an independent sub-feed inlet, an independent sub-discharge outlet and a branch air-blasting port capable of being controlled independently; all the sub-discharge outlets of the sub-hoppers are communicated with a thermostatic chamber arranged below the sub-discharge outlets; a main discharge outlet and a main air supply port are arranged at the lower part of the thermostatic chamber; and the thermostatic chamber and each sub-hopper are provided with independent temperature control systems respectively.

6 Claims, 4 Drawing Sheets

(56) References Cited

U.S. PATENT DOCUMENTS

| | | | |
|---|---|---|---|
| 6,003,332 A * | 12/1999 | Foster | 62/601 |
| 2010/0242354 A1* | 9/2010 | Perkins et al. | 44/639 |
| 2012/0047761 A1* | 3/2012 | Lou | 34/168 |

FOREIGN PATENT DOCUMENTS

| | | | |
|---|---|---|---|
| DE | 2543034 A1 | | 5/1976 |
| EP | 0312741 A2 | | 4/1989 |
| EP | 2415574 A1 | * | 2/2012 |
| FR | 2608498 A1 | | 6/1988 |
| GB | 852701 | * | 10/1960 |
| JP | 2286213 A | | 11/1990 |
| JP | 7112438 A | | 5/1995 |
| JP | 2000-167840 A | | 6/2000 |
| JP | 2002-144336 A | | 5/2002 |
| WO | WO 2010111936 A1 | * | 10/2010 |

* cited by examiner

HOPPER OF INJECTION MOLDING MACHINE

CROSS-REFERENCE TO RELATED APPLICATIONS

This patent application is a continuation of International Patent Application No. PCT/CN2010/071396, filed Mar. 29, 2010, which claims priority to Chinese Patent Application No. 200910301207.1, filed Mar. 30, 2009, both of which are hereby incorporated by reference.

FIELD OF THE INVENTION

This invention relates to a hopper of an injection molding machine, and more particularly, to an integrated multi-compartment staged plastic drying hopper, which can simultaneously perform independent drying and conditioning on a variety of raw materials.

BACKGROUND OF THE INVENTION

In the injection molding process for plastic products, the amount of water contained in raw materials is generally required not to exceed 5%. As a result, drying and conditioning need to be performed on the raw materials before the injection molding process, and the general process for drying and conditioning treatment is performed on the raw materials at a temperature of 90-200° C. for 1-6 hours.

Conventionally, the injection molding hopper is provided with a special conditioning and drying device before a thermostatic bucket, the raw materials are then further sent into the thermostatic bucket after the drying and conditioning are completed, and a large amount of heat is dissipated during the process. Additionally, the existing conveying process could easily cause secondary pollution of the raw materials; therefore, not only is it a waste of human and material resources, but it also greatly affects the quality of products.

In addition, during the injection molding process of multi-layer composite plastic products, as the drying and conditioning processes of the different raw materials adopt different temperatures and times, a plurality of special conditioning and drying devices are required for processing a variety of the different raw materials, which make the above-mentioned problems become particularly worse.

The Chinese patent (Publication No. CN101491935A, published on Jul. 29, 2009) discloses a system and a method for synchronously controlling temperature of a hopper of an injection molding machine, and aims at providing the system for enabling the temperatures of all sections of the hopper in the injection molding machine to be synchronous and a control method thereof. The system comprises a plurality of electric heaters positioned in the positions of all the sections of the hopper and temperature sensors in the corresponding mounting positions. All the temperature sensors are connected to a temperature setting module through signal wires. The temperature setting module, a temperature synchronization control module and a PID (proportion integration differentiation) control module are sequentially connected through the signal wires. The PID control module is connected to all the electric heaters through the signal wires.

Under the situation that the temperatures of all the sections of the hopper of the injection molding machine are set to be inconsistent or the heat radiation situations are inconsistent, the temperatures of all the sections can simultaneously achieve the set value by rapid control. When errors between the temperature set value and the actual values of all the sections of the hopper are detected in a real-time manner, control outputs of all the sections are obtained for controlling all the sections of the heaters to work, thereby realizing precision control of the temperatures of all the sections and achieving the effects of enabling the temperatures of all the sections of the hopper of the injection molding machine, so as to make the temperatures of all the sections of the hopper synchronous and rapidly achieve the set temperature.

The method of the Chinese patent (Publication No. CN101491935A) provides the sectional temperature control assumption for the single hopper, which is conductive to improve the temperature control precision. However, the method cannot solve the following technical problems: (1) the amount of energy consumption in the link of transferring the raw materials in the injection molding process is significant, (2) the labor intensity of workers is high, (3) secondary pollution of the raw materials occurs frequently, and (4) decreased product quality.

BRIEF SUMMARY OF THE INVENTION

The invention provides an integrated multi-compartment staged plastic drying hopper which costs less in energy consumption, is time-saving and labor-saving, and has no secondary pollution, but provides a higher-quality product, so as to solve the above-mentioned problems: (1) the large amount of energy consumption in the link of transferring the raw materials in the injection molding process, (2) the high labor intensity of workers, (3) the frequent secondary pollution of the raw materials, and (4) the decreased product quality.

In order to achieve the technical purposes, the adopted specific technical scheme is as follows: an integrated multi-compartment staged plastic drying hopper comprises a combined hopper, an electric heating air-blasting system and a temperature control system, wherein the combined hopper comprises two or more than two sub-hoppers; each sub-hopper is provided with an independent sub-feed inlet, an independent sub-discharge outlet and a branch air-blasting port capable of independently performing switching control; all the sub-discharge outlets of the sub-hoppers are communicated with a thermostatic chamber arranged below the sub-discharge outlets; a main discharge outlet and a main air supply port are arranged at the lower part of the thermostatic chamber; and the thermostatic chamber and each sub-hopper are provided with independent temperature control systems respectively.

A drying and conditioning device of the raw materials, which is independently and separately arranged in the prior art, is arranged at the upper part of the hopper of the injection molding machine in a centralized manner. Each sub-hopper is provided with the independent sub-feed inlet, the independent sub-discharge outlet and the branch air-blasting port capable of independently performing the switching control. The lower part of the hopper of the injection molding machine is used as the thermostatic chamber. The main discharge outlet and the main air supply port are arranged at the lower part of the thermostatic chamber, and the thermostatic chamber and each sub-hopper are provided with the independent temperature control systems, respectively, so that a variety of the raw materials can adopt different temperatures and times in all the sub-hoppers for independently performing drying and conditioning. After completing all the drying and conditioning, only the sub-discharge outlets need to be opened, then the raw materials in the sub-hoppers may directly enter into the thermostatic chamber, and injection molding operation may be performed after mixing and temperature adjusting treatment in the thermostatic chamber.

As the drying and conditioning of the variety of the raw materials are completed in the same big container, during the transferring process and high labor intensity of the workers in a split structure, not only can the problem of significant heat loss be avoided, the secondary pollution problem during the transferring process can also be avoided, and the product quality can be ensured.

In particular, the number of the sub-hoppers is generally consistent with the number of varieties of the raw materials to be dried and conditioned. In addition, auxiliary materials can be placed in the sub-hoppers for heating, and then the number of the sub-hoppers can be larger than the number of the varieties of the raw materials. The size of each sub-hopper can be determined according to the quantity of the raw material or the auxiliary material on the volume of the sub-hopper. As a result, it is the sub-hoppers which can adopt the structures in the same size, or the structures with the mixed sizes.

In another embodiment, the branch air-blasting ports of the sub-hoppers are connected in an air-blasting system through branch air-blasting circuits, an air distribution valve and a branch heating device are arranged on each branch air-blasting circuit. The main air supply port on the thermostatic chamber and the branch air-blasting circuits are connected in the same air-blasting system in parallel through a main air-blasting circuit, and a main air valve and a main heating device are arranged on the main air-blasting circuit. As the whole system adopts hot air for heating, and the same air-blasting system is adopted, costs can be minimized. In addition, each sub-hopper and the thermostatic chamber can control the heating temperature and the heating time through the air valve and the heating device.

In another embodiment, the sub-grid nets are arranged among accommodating spaces at the upper parts of the sub-hoppers, the sub-discharge outlets and the branch air-blasting ports, and a main grid net is arranged among the thermostatic chamber, the main discharge outlet and the main air supply port. The grid nets are arranged in the sub-hoppers and the thermostatic chamber, a certain space can be formed in a bottom region of the sub-hoppers or the thermostatic chamber, and the space can enable the hot air which enters into the sub-hoppers or the thermostatic chamber to uniformly enter into the raw material regions of the sub-hoppers or the thermostatic chamber, thereby ensuring uniform heating of the raw materials.

In another embodiment, a flip-open cover is arranged on the sub-feed inlet of each sub-hopper. Each flip-open cover is hinged with the corresponding sub-hopper, an air permeable port is arranged on each flip-open cover, and an air outlet is also arranged above the thermostatic chamber. The flip-open cover structures can facilitate the adding of the raw materials, and the air permeable ports are used for discharging wet gas in the sub-hoppers. In a likely way, an air outlet is also correspondingly arranged above the thermostatic chamber.

In another embodiment, a stirring device is arranged in the thermostatic chamber. The stirring device can enable the raw materials, which fly out of all the sub-hoppers, to be rapidly uniformly mixed, thereby ensuring the uniformity degree of all the raw materials in the thermostatic chamber.

In another embodiment, thermal insulation and separation layers are arranged between every two sub-hoppers and between each sub-hopper and the thermostatic chamber, respectively. The thermal insulation and separation layers are configured to: 1) realize thermal insulation, and 2) ensure the relative independence of all the sub-hoppers and the thermostatic chamber, prevent the excessive heat transfer between each sub-hopper and the thermostatic chamber, and further to avoid affecting the respective temperature regulation.

The invention could effectively solve the problems of substantial heat loss during the link of transferring the raw materials in the existing injection molding production process, high labor intensity of the workers, frequent occurrence of secondary pollution caused by the raw materials, and impacts on the product quality. Furthermore, the invention provides a simple structure, which requires low energy consumption, with lower labor costs, but high working efficiency and good product quality.

BRIEF DESCRIPTION OF THE SEVERAL VIEWS OF THE DRAWING(S)

In FIGS. 1-4,
1: sub-feed inlet;
2: accommodating space;
3: sub-grid net;
4: main grid net;
5: main discharge outlet;
6: main air supply port;
7: sub-discharge outlet;
8: branch air-blasting port;
9: thermostatic chamber;
10: air permeable port;
11: air-blasting system;
12: branch heating device;
13: stirring device;
14: air distribution valve;
15: main air valve;
16: main heating device;
17: motor.

DETAILED DESCRIPTION OF THE INVENTION

In combination of the figures, the technical scheme of the invention is further specifically described through the following embodiments The following examples further illustrate the invention but, of course, should not be construed as in any way limiting its scope.

EXAMPLE 1

Figure 1:
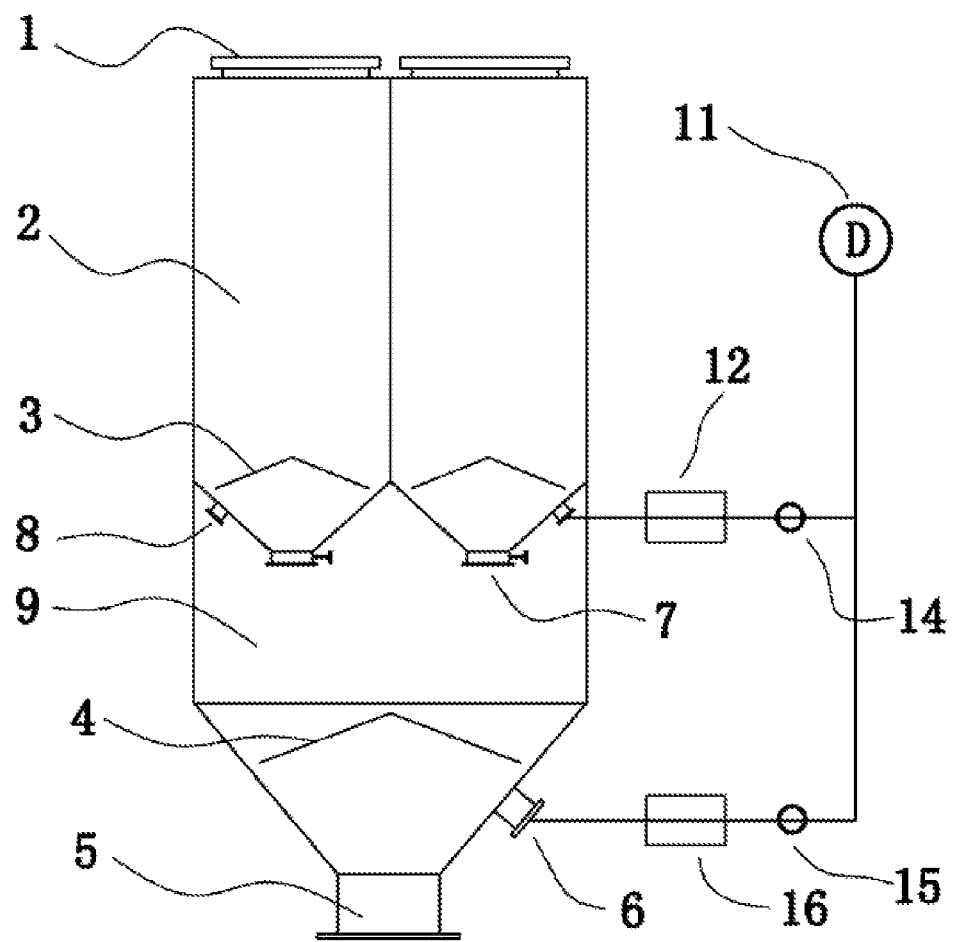
FIG. 1 is a schematic diagram of the structure for an integrated multi-compartment staged plastic drying hopper of the invention.
Figure 3:
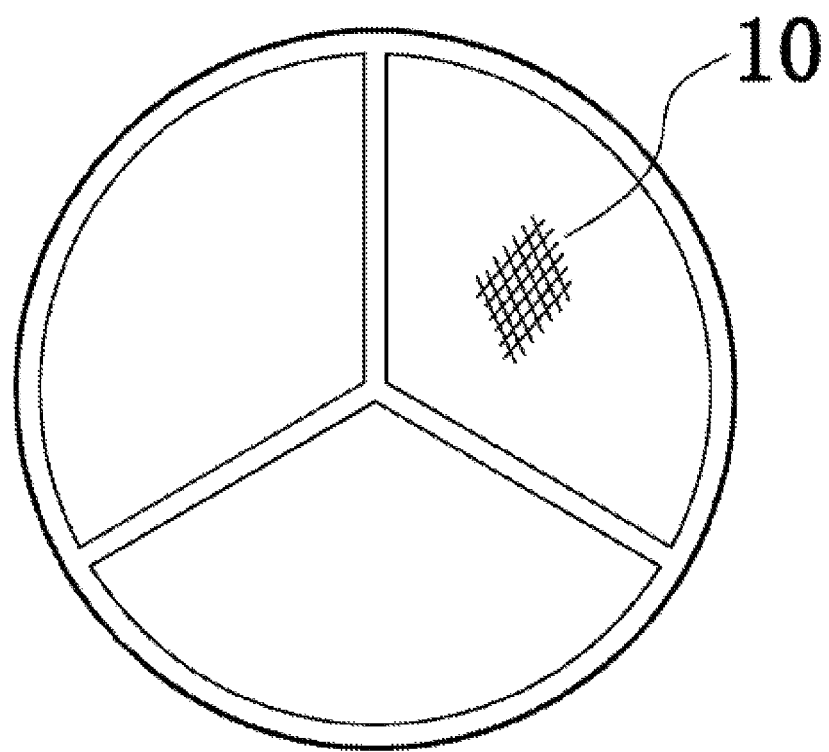
FIG. 3 is a schematic diagram of overhead view of the structure of FIG. 1.

In the embodiment 1 as shown in FIG. 1 and FIG. 3, an integrated multi-compartment staged plastic drying hopper comprises a combined hopper, an electric heating air-blasting system and a temperature control system, wherein the combined hopper comprises three sub-hoppers; each sub-hopper is provided with an independent sub-feed inlet 1, an independent sub-discharge outlet 7 and a branch air-blasting port 8 capable of independently performing switching control; all the sub-discharge outlets 7 of the sub-hoppers are communicated with a thermostatic chamber 9 arranged below the sub-discharge outlets; a main discharge outlet 5 and a main air supply port 6 are arranged at the lower part of the thermostatic chamber; and the thermostatic chamber and each sub-hopper are provided with independent temperature control systems respectively.

Sub-grid nets 3 are arranged among accommodating spaces 2 at the upper parts of the sub-hoppers, the sub-discharge outlets 7 and the branch air-blasting ports 8, and a main grid net 4 is arranged among the thermostatic chamber 9, the main discharge outlet 5 and the main air supply port 6.

The branch air-blasting ports 8 of the sub-hoppers are connected in an air-blasting system 11 through branch air-blasting circuits, an air distribution valve 14 and a branch heating device 12 are arranged on each branch air-blasting circuit, the main air supply port 6 on the thermostatic chamber and the branch air-blasting circuits are connected in the same air-blasting system in parallel through a main air-blasting circuit, and a main air valve 15 and a main heating device 16 are arranged on the main air-blasting circuit.

A flip-open cover is arranged on the sub-feed inlet 1 of each sub-hopper, each flip-open cover is hinged with the corresponding sub-hopper, an air permeable port 10 is arranged on each flip-open cover, and an air outlet is also arranged above the thermostatic chamber. Thermal insulation and separation layers are arranged between every two sub-hoppers and between the sub-hoppers and the thermostatic chamber respectively.

EXAMPLE 2

Figure 2:
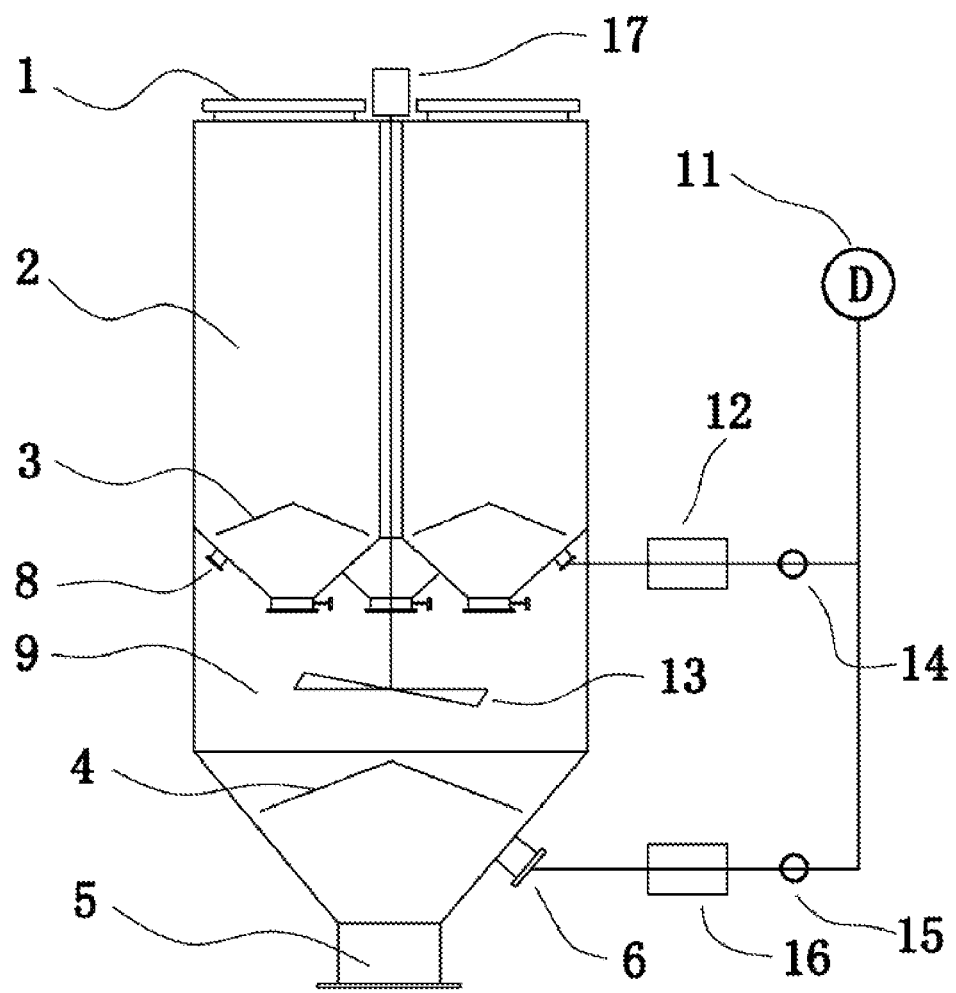
FIG. 2 is another schematic diagram of the structure for an integrated multi-compartment staged plastic drying hopper of the invention.
Figure 4:
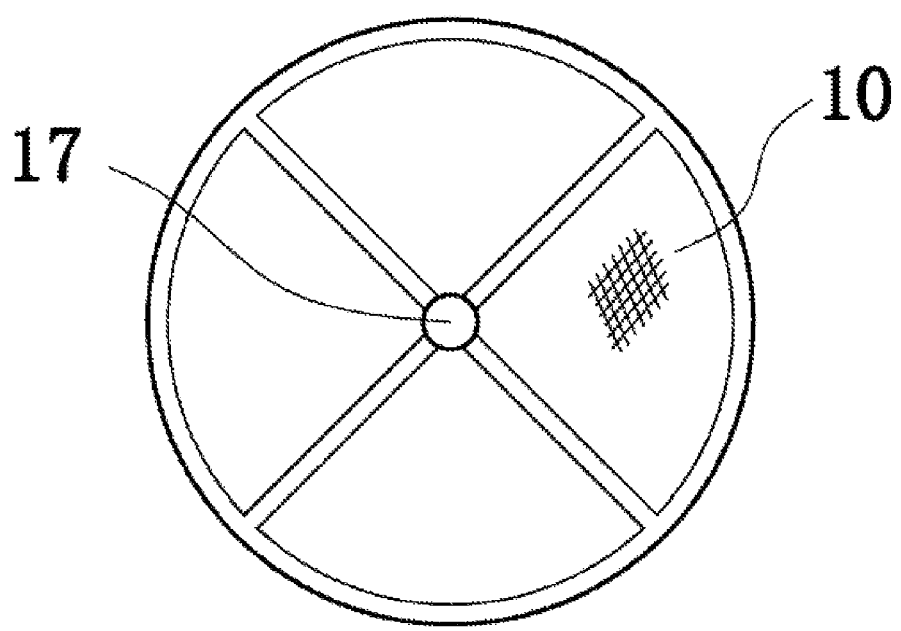
FIG. 4 is a schematic diagram of overhead view of the structure of FIG. 2.

In the embodiment 2 as shown in FIG. 2 and FIG. 4, the combined hopper comprises four sub-hoppers, wherein a stirring device 13 is arranged in the thermostatic chamber 9, the stirring device is connected with a motor 17 arranged at the top part of the sub-hoppers, and other content is the same with that of the embodiment 1.

When the integrated multi-compartment staged plastic drying hopper works, a variety of raw materials or auxiliary materials are placed into the sub-hoppers, the air distribution valves and the branch heating devices on the corresponding air-blasting circuits are controlled according to drying and conditioning requirements of the different raw materials, hot air is upwards blown into the sub-hoppers from the branch air-blasting ports.

The drying and conditioning treatment is performed on the different raw materials with the different heating times at the different temperatures, a small amount of water vapor is over flown from the air permeable ports during the drying and conditioning process. The sub-discharge outlets are opened after completing all the drying and conditioning, then the raw materials in the sub-hoppers can directly enter into the thermostatic chamber.

The stirring device can be used when the raw materials enter into the thermostatic chamber for mixing, the temperature control of the thermostatic chamber is performed by the main air valve and the main heating device on the main air-blasting circuit, the hot air is blown upward into the thermostatic chamber from the main air supply port, waste gas generated by the thermostatic chamber is exhausted from the air outlet, and the injection molding operation can be performed after mixing and temperature adjusting treatment of the raw materials in the thermostatic chamber.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An integrated multi-compartment staged plastic drying hopper, comprising:
    a combined hopper;
    an electric heating air-blasting system; and
    a temperature control system;
    wherein the combined hopper comprises two or more sub-hoppers, each of the sub-hoppers being provided with an independent sub-feed inlet, an independent sub-discharge outlet and a branch air-blasting port, which are configured to independently perform switching control;
    wherein all the sub-discharge outlets of the sub-hoppers are communicated with a thermostatic chamber which is arranged below the sub-discharge outlets;
    wherein a main discharge outlet and a main air support port are arranged at the lower part of the thermostatic chamber; and the thermostatic chamber and each sub-hopper are respectively provided with independent temperature control systems.

2. The integrated multi-compartment staged plastic drying hopper according to claim 1, wherein the branch air-blasting ports of the sub-hoppers are connected in an air-blasting system through branch air-blasting circuits, and wherein the integrated multi-compartment staged plastic drying hopper further comprises:
    an air distribution valve and a branch heating device, which are arranged on each branch air-blasting circuit;
    the main air support port which is on the thermostatic chamber and the branch air-blasting circuits, which are connected in the same air-blasting system in parallel through a main air-blasting circuit; and a main air valve and a main heating device, which are arranged on the main air-blasting circuit.

3. The integrated multi-compartment staged plastic drying hopper according to claim 1, further comprising:
sub-grid nets, which are arranged among accommodating spaces at the upper parts of the sub-hoppers; and
a main grid net, which is arranged among the thermostatic chamber, the main discharge outlet and the main air supply port.

4. The integrated multi-compartment staged plastic drying hopper according to claim 1, further comprising:
a flip-open cover, which is arranged on the sub-feed inlet of each of the sub-hoppers, each flip-open cover is hinged with the corresponding sub-hopper;
an air permeable port, which is arranged on each flip-open cover; and
an air outlet, which is arranged in the thermostatic chamber.

5. The integrated multi-compartment staged plastic drying hopper according to claim 1, further comprising a stirring device, which is arranged in the thermostatic chamber.

6. The integrated multi-compartment staged plastic drying hopper according to claim 1, further comprising thermal insulation and separation layers, which are arranged between every two sub-hoppers and between each of the sub-hoppers and the thermostatic chamber respectively.

* * * * *